Jan. 5, 1932.   L. DUFAY   1,839,956

COLOR PRINTING

Filed Aug. 24, 1928

Inventor:
Louis Dufay,
By
Attorneys.

Patented Jan. 5, 1932

1,839,956

UNITED STATES PATENT OFFICE

LOUIS DUFAY, OF VERSAILLES, FRANCE

COLOR PRINTING

Application filed August 24, 1928, Serial No. 301,948, and in France August 29, 1927.

Hitherto, the usual method of obtaining reproduction, printing, or multiplication of a transparent colored image obtained by the process utilizing juxtaposed green, violet and orange screens, has been to select the colors of the proofs to be reproduced, photographically by means of sensitized screens, formed similarly to those used for the production of the proof to be reproduced, by means of green, violet and orange elements.

It is known that whilst green, violet and orange elements effect correct selection, their colorimetric intensity must be such that each colored element absorbs two-thirds of the solar spectrum and only allows one-third to pass. The result is that the general intensity of the screen thus formed is very high and that when examined by reflected light the general tone of such a screen is almost black. The photographic image is considerably obscured thereby which, in addition to other disadvantages, renders examination of the colored proofs by reflected light impossible and limits the color photography to transparent images alone.

The present invention is based on the novel feature that in the case of reproduction, printing and multiplication of a transparent colored proof obtained by the process utilizing screens having juxtaposed green, violet and orange elements, that is to say, a proof in which the colors have already been selected by the colored elements which form it and impart to it its color variations by synthesis, it is unnecessary in order to reproduce the said color variations, to use a selecting screen having binary green, violet and orange elements, but in this case a screen formed by juxtaposed elements of simple or primary colors such as yellows, blues and reds, suitably selected and defined, gives all the advantages of the binary color screens hitherto utilized without having any of the disadvantages thereof, although it is extremely well known and established that these simple or primary colors have no direct selective action.

It is in fact to be noted that, in the special case of reproduction, printing, or multiplication of colored proofs obtained by the selective screen process, it is no longer a question of selecting the colors but solely of recording them and reforming them in the same manner, i. e., already selected as on the original proof, in which all the colors can be reduced to green, violet and orange. The function of the reproducing screen is thus limited to correct recording of these three selective colors and a screen having yellow, red and blue elements (called a "positive" screen) is capable of fulfilling this object, the only condition being that each of the colored elements of the positive screen shall allow two coloring elements of the green, violet and orange screen of the original proof (called the "negative" proof) to pass and be opaque to the third element.

The invention consists in a process for obtaining pictures in natural colors; the said process comprises producing a negative colored picture on a negative transparent colored proof having juxtaposed green, violet and orange portions and producing therefrom a positive colored picture on a positive screen having juxtaposed yellow, blue and red portions selectively passing respectively green-yellow-orange-red, violet-blue-green and red-orange-violet.

In this screen, the yellow must allow all the green, yellow, orange and red rays of the solar spectrum to pass through, whilst cutting off entirely violet and blue rays. The blue must be transparent to the violet and green rays and absorb the orange and red, and, finally, the red must be transparent to the red, orange and violet rays and opaque to the complementary rays of the solar spectrum, i. e., the blue and green of said spectrum. Yellow, red and blue dyes can easily be found which will satisfy the above conditions and be of such brightness that the positive screen thus formed has a luminosity considerably greater than the negative screens of binary colors, and practically sufficient in all cases to allow a positive image obtained by photographic means (contact or enlargement) on such a screen to be examined by reflected light, with good impression of the color values and light and shade of the photographic object.

The positive screens having juxtaposed yellow, red and blue elements can be obtained on a technical scale by any suitable process on paper or any other suitable translucent, reflecting, or transparent backing or base, particularly by dyeing, grinding, spraying, photographic impression or photo-mechanical means, photography, lithography or engraving, using transparent inks, solutions or dyeing particles of any suitable chemical nature. The colored elements can have any disposition and shape such as regular or irregular lines or dots.

The accompanying drawings show a positive screen of the above kind.

Figure 1:
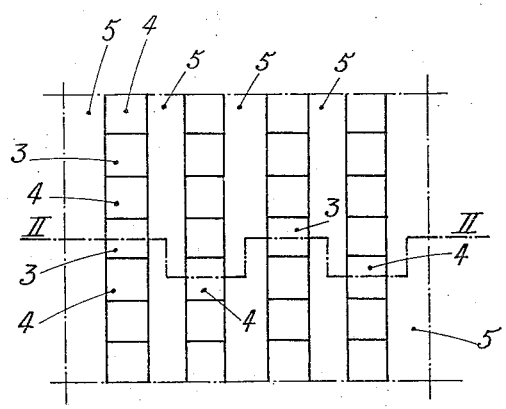
Figure 1 shows at an enlarged scale, a part of the emulsioned face of a positive screen manufactured according to the said invention.
Figure 2:
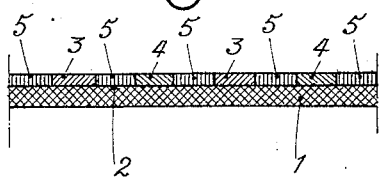
Figure 2 shows at the same scale, a cross section of the same screen along the broken line II—II of Figure 1.

Figures 1 and 2, 1 is the base or carrier provided with one emulsioned side 2; on the said face 3—3 show the yellow portions, 4—4 the blue portions and 5—5 the red portions; the said portions have been colored by treating them by any suitable means, but by using according to the present invention for coloring the yellow portions 3—3 a coloring or dying solution selectively passing green-yellow-orange-red, for instance, an erythrosine solution, for coloring the blue portions 4—4, a coloring or dyeing solution selectively passing violet-blue-green, for instance a blue carmine solution and for coloring the red portions 5—5, a coloring or dyeing solution selectively passing red-orange-violet, for instance, a tartrazine or auramine solution.

I declare that what I claim is:—

A process for obtaining pictures in natural colors which comprises producing a negative colored picture on a negative transparent colored proof having juxtaposed green, violet and orange portions and producing therefrom a positive colored picture on a positive screen having juxtaposed portions selectively passing green-yellow-orange-red, violet-blue-green and red-orange-violet, said screen having a photographic emulsion thereon.

In witness whereof, I have hereunto signed my name this 14th day of August, 1928.

LOUIS DUFAY.